UNITED STATES PATENT OFFICE 2,377,624

METHOD FOR THE SEPARATION OF PROTEIN FROM ANIMAL MATTER CONTAINING PROTEIN IN WATER-SOLUBLE FORM

William G. Gordon, Philadelphia, Pa., assignor to Smith, Kline & French Laboratories, Philadelphia, Pa., a corporation of Pennsylvania No Drawing. Application September 9, 1943, Serial No. 501,672

13 Claims. (Cl. 260—112)

This invention relates to a method for the separation and recovery of protein from animal matter containing protein recoverable in water-soluble form.

The method according to this invention is efficient and economical and the protein product will be recovered in undenatured, water-soluble, heat coagulable form and variously adaptable for food and commercial use.

The method according to this invention involves essentially precipitation of protein from animal matter containing protein recoverable in water-soluble form, through the medium of metaphosphoric acid and removal of the metaphosphate radical from the precipitate (protein metaphosphate).

More particularly, the removal of the metaphosphate radical is accomplished by dissociation of the protein metaphosphate, in suspension in water, with an alkali, removal of the alkali metaphosphate as a precipitate or by dialysis, depending upon the alkali used to effect dissociation, and recovery of protein from solution under conditions to avoid denaturation of the protein.

More specifically, preferable procedure according to this invention will comprise precipitation of protein from animal matter, as whey, bovine serum, and the like, by metaphosphoric acid, dissociation of the protein-metaphosphate, in suspension in water, through the medium of an alkali, with the production of protein in solution and of alkali metaphosphate partly precipitated and partly in colloidal solution, flocculation of the alkali metaphosphate in colloidal solution with an acid, separation of the precipitated and flocculated metaphosphate from the protein solution, after neutralization of the solution, and drying the protein solution for recovery of the protein.

In proceeding with the initial treatment of animal matter, as bovine serum, and the like, for the precipitation of protein, any suitable source of metaphosphoric acid may be used. Thus, the animal matter may be treated with metaphosphoric acid or equivalently with any water-soluble metaphosphate, hexametaphosphate, or the like, capable of yielding metaphosphoric acid upon the addition of acid. By way of example, without limitation upon the broad statement, sodium, ammonium, potassium, metaphosphate or hexametaphosphate will be effective.

When the treatment of the animal matter is with a metaphosphate, a hexametaphosphate, or the like, an acid will be added to release metaphosphoric acid. Any organic or inorganic acid may be used for this purpose so long as it does not itself form a water-insoluble compound with protein and is of sufficient strength to produce the desired pH value, which will appear, for the precipitation of the protein as protein metaphosphate. Thus, for example, but without limitation upon the term "acid," hydrochloric, sulphuric, nitric, phosphoric, acetic acids will be effective. It may be noted that where the protein product is intended for use as food, it will be desirable to use an acid which does not produce toxic effects.

To effect the precipitation of protein through the medium of metaphosphoric acid, the pH value of the animal matter will be adjusted to within about the range pH 4.3–pH 1.0, or within the narrower range pH 3.5–pH 1.8, and preferably to about pH 3.0. The adjustment of the pH value will, of course, be accomplished through the medium of the metaphosphoric acid if such be used, or the acid used in connection with a source of metaphosphoric acid, if such be used.

The precipitated protein metaphosphate after separation, as by centrifugation, filtration, or the like, and washing with water, is suspended in water and dissociated by treatment with an alkali. In this step any alkali, which itself will not form a water-insoluble precipitate with protein, may be used. However, the alkali will preferably be one which will form a water-insoluble metaphosphate. Without limiting the term "alkali," for example, calcium hydroxide, barium hydroxide will be found to be effective. Alkalis such as sodium, potassium and ammonium hydroxides, carbonates and bicarbonates may be used, but such will produce water-soluble metaphosphates, and it will be necessary to dialyze the protein solution to remove metaphosphate ion. Where the protein is intended for food use the alkali will desirably be one which is non-toxic.

The dissociation of the protein metaphosphate through the medium of an alkali will be accomplished with adjustment of the pH value of the vehicle (water) to within about the range pH 6.0–pH 12.0, or within the narrower range pH 8–pH 9.75 and preferably to about pH 9.0.

The dissociation of the protein metaphosphate will produce protein in solution and, when an alkali which does not form a water-soluble metaphosphate is used, alkali metaphosphate partly precipitated and partly in colloidal solution. When a water-soluble alkali metaphosphate is produced the metaphosphate ions are removed by dialysis, leaving the protein in pure form in solution.

When the alkali metaphosphate is partly precipitated and partly in colloidal solution, and the use of an alkali which will produce a water-insoluble metaphosphate is greatly preferred, the alkali metaphosphate in colloidal solution is flocculated, by treatment of the mixture with an acid. The acid may be any acid of a strength sufficient to produce the desired pH value, as will appear, and which will not itself form a water-insoluble compound with protein. By way of example, without other limitation upon the term "acid," hydrochloric, nitric, acetic, lactic acids will be effective. The acid will preferably be a non-toxic acid where the protein is intended for food use.

Flocculation of the alkali metaphosphate will be effected by the addition of the acid. Desirably, though not necessarily, the acid will be used in amount to bring the pH value of the vehicle within about the range pH 1.0–pH 5.5.

The protein solution is then brought to a pH value of about pH 6.5–pH 8.0 by the addition of any alkali which will not combine with the protein with formation of a water-insoluble compound, preference being had for one which is non-toxic when the protein product is intended for food use. By way of example, but without limitation on the term "alkali," sodium, potassium, ammonium and calcium hydroxide, carbonate, or bicarbonate will be effective.

After neutralization of the solution the flocculated alkali metaphosphate, which settles out as a gelatinous precipitate, is removed, by centrifuging, filtering or otherwise, and washed with water, the wash water being desirably returned to the protein solution.

The protein solution is then dried in any suitable manner with avoidance of denaturation of the water-soluble protein.

As a specific illustration of procedure according to this invention, for the recovery of protein from, for example, whey, there is mixed with a quantity of acid whey, having, for example, a pH value of about pH 4.2, sufficient sodium metaphosphate or hexametaphosphate to react with the protein content of the whey and sufficient hydrochloric acid to effect adjustment of the pH value of the mixture to about pH 3.0, with precipitation of protein metaphosphate.

The order of the addition of the alkali hexametaphosphate, or alkali metaphosphate, and of the acid to the whey is not of primary importance. However, it will be found that if the acid be first added and then the alkali hexametaphosphate, or alkali metaphosphate, settlement of the precipitate will be greatly facilitated.

The amount of sodium hexametaphosphate to be added to any given quantity of whey may be readily estimated from the fact that in general the protein in 100 cc. of whey will be reacted with about 0.2 gram of sodium hexametaphosphate.

The amount of acid required to adjust the pH value to about 3.0 will be readily determined on the basis of the pH value of the whey and the amount of alkali hexametaphosphate, or alkali metaphosphate, used.

The precipitated protein metaphosphate will be separated from the solution in any convenient manner, as, for example, by centrifuging, filtering, or the like, and will desirably be washed with water.

To the separated protein metaphosphate will be added a quantity of water and calcium hydroxide in amount somewhat in excess of that which would be chemically equivalent to the amount of metaphosphate ($PO_3$ ions) originally used, and then hydrochloric acid will be added to effect adjustment of the pH value of the vehicle to about pH 9.0. The protein metaphosphate in the vehicle will dissociate, in the course of about twenty minutes, with the production of protein in solution, calcium metaphosphate partly precipitated and partly in colloidal solution, and with excess calcium hydroxide present.

Then to the solution thus obtained will be added sufficient hydrochloric acid to bring the pH value of the solution to about 5.0, when the calcium metaphosphate will flocculate and settle out as a gelatinous precipitate.

The pH value of the solution is then adjusted to a pH value of about pH 6.5–pH 8.0, preferably about pH 7.0, by the addition of sodium hydroxide solution.

After adjustment of the pH value of the solution to pH 6.5–pH 8.0 the precipitated calcium metaphosphate will be removed by centrifuging, filtering, or the like, and desirably the precipitate will be washed with a small quantity of water, to recover the adhering protein solution, which will be returned to the original solution.

The protein solution is then dried, for example, by heating to a temperature of 45–50° C. under a pressure of about 20–40 mm. mercury. The dry protein obtained will be in solid form and, as will be obvious, may be ground to powder. Alternatively, the protein solution may be spray dried with initial production of the protein in powdered form, or by any other suitable method which will not cause heat denaturation of the protein.

As a further specific example of procedure according to this invention for the recovery of protein from, for example, bovine serum, to about 100 milliliters of bovine serum containing 6.5 grams protein there is added about 2 milliequivalents (.204 gram) of sodium hexametaphosphate per gram of protein and sufficient hydrochloric acid to effect adjustment of the pH value of the mixture to about pH 3.0 with precipitation of protein metaphosphate.

The order of addition of the alkali hexametaphosphate and of the acid to the bovine serum is not of great importance. However, if it be found that the acid be first added, then the hexametaphosphate, settlement of the protein precipitate will be greatly facilitated.

The precipitate, protein metaphosphate, is separated, as, for example, by centrifuging, filtering, or the like, and will desirably be washed with water.

The precipitate will then be suspended in about 100 milliliters of water and to the suspension will be added 150 milligrams (.150 gram) of calcium hydroxide per 2 milliequivalents (.204 gram) of metaphosphate originally used. The calcium hydroxide will raise the pH of the suspension to about pH 10.5. Hydrochloric acid is then immediately added to the suspension in amount sufficient to adjust the pH to about pH 9.0–9.5, and the suspension permitted to stand for a period of say about half an hour, in which time the protein metaphosphate will dissociate with the production of protein in solution, calcium phosphate partly precipitated and partly in colloidal solution, and with excess calcium hydroxide present.

To the solution thus obtained will be added sufficient hydrochloric acid to adjust the pH of the solution to about pH 5.0, when the calcium metaphosphate will flocculate and settle out as a gelatinous precipitate. After the solution has stood for a few minutes the pH value is adjusted to about pH 7.0 by the addition of sodium hydroxide solution to complete the flocculation.

When the flocculation is complete, the precipitated calcium phosphate will be removed by centrifuging, filtering, or the like, and desirably the precipitate will be washed with a small quantity of water to recover adhering protein solution, which will be returned to the original solution. The protein solution thus obtained is then dried by heating to a temperature of say 40-50° C. under pressure of about 40 mm. mercury. The dry protein thus obtained will be in solid form and, as will be obvious, may be ground to powder. Alternatively the protein solution may be spray dried in any suitable manner with avoidance of heat denaturation of the protein.

The protein product obtained from animal matter containing protein recoverable in water-soluble form according to the method of this invention will be found to possess many advantageous characteristics, and in particular that it will be in undenatured, water-soluble, heat coagulable form.

It will be understood that it is not intended that this invention be limited to the details variously involved in the above description of the method and its carrying out, given for illustrative purposes, since it is contemplated that the procedure may be variously modified in detail without departing from the scope of the invention as defined in the appended claims.

This application is a continuation-in-part of application filed by me, Serial No. 424,125, filed December 23, 1941, which in turn is a continuation-in-part of application filed by me, Serial No. 378,944, filed February 14, 1941.

What I claim and desire to protect by Letters Patent is:

1. In a method of separating protein from animal matter containing protein recoverable in water-soluble form from the group consisting of whey and animal serum, the steps comprising precipitating protein from animal matter containing protein recoverable in water-soluble form by means of metaphosphoric acid, dissociating the precipitate in the presence of water containing an alkali which will form a water-insoluble compound with metaphosphate ions and recovering protein from the water.

2. In a method of separating protein from whey the steps comprising precipitating protein from whey by means of metaphosphoric acid, dissociating the precipitate in the presence of water containing an alkali which will form a water-insoluble compound with metaphosphate ions and recovering protein from the water.

3. In a method of separating protein from whey the steps comprising precipitating protein from whey having a pH value within about the range pH 4.3-pH 1.0 by means of metaphosphoric acid, dissociating the precipitate in the presence of water containing an alkali which will form a water-insoluble compound with metaphosphate ions and recovering protein from the water.

4. In a method of separating protein from whey the steps comprising precipitating protein from whey by means of metaphosphoric acid, dissociating the precipitate by means of an aqueous alkali solution which will produce a water-insoluble compound with metaphosphate ions under conditions of hydrogen ion concentration within about the range pH 6.0-pH 12.0, separating alkali metaphosphate formed and recovering soluble protein from the water.

5. In a method of separating protein from whey the steps comprising precipitating protein from whey by means of metaphosphoric acid, dissociating the precipitate with an aqueous alkali solution, which will produce a water-insoluble compound with metaphosphate ions, flocculating metaphosphate formed, separating flocculated alkali metaphosphate from the water and recovering soluble protein from the water.

6. In a method of separating protein from whey the steps comprising precipitating protein from whey by means of metaphosphoric acid, separating metaphosphate radical from the precipitate by means of an aqueous solution of an alkali which will form a water-insoluble compound with metaphosphate ions, adding to the solution an acid which will not form with protein a water-insoluble compound to effect flocculation of alkali metaphosphate formed, separating flocculated alkali metaphosphate and recovering soluble protein from the water.

7. In a method of separating protein from whey the steps comprising precipitating protein from whey by means of metaphosphoric acid, separating metaphosphate radical from the precipitate in the presence of water by means of an alkali which will form a water-insoluble compound with metaphosphate ions, flocculating alkali metaphosphate formed by means of an acid which will not react with protein to form a water-insoluble compound in amount such as to adjust the pH value of the water to within about the range pH 5.5-pH 1.0, separating flocculated alkali metaphosphate and recovering soluble protein from the water.

8. In a method of separating protein from whey the steps comprising precipitating protein from whey having a pH value within about the range pH 4.3-pH 1.0 by means of metaphosphoric acid, separating metaphosphate radical from the precipitate in the presence of water by means of an alkali which will form a water-insoluble compound with metaphosphate ions, under conditions of hydrogen ion concentration within about the range pH 6.0 to pH 12.0, flocculating alkali metaphosphate formed by means of an acid which will not react with protein to form a water-insoluble compound in amount such as to adjust the pH value of the water within about the range pH 5.5-pH 1.0, separating flocculated alkali metaphosphate and recovering soluble protein from the water.

9. In a method of separating protein from whey the steps comprising precipitating protein from whey at a pH value within about the range pH 4.3-pH 1.0 by means of metaphosphoric acid, separating metaphosphate radical from the precipitate through the medium of calcium hydroxide in the presence of water, under conditions of hydrogen ion concentration within about the range pH 6.0-pH 12.0, flocculating the calcium metaphosphate formed by means of hydrochloric acid in amount to adjust the pH value of the water to within about the range pH 5.5 to pH 1.0, neutralizing the solution, separating flocculated calcium metaphosphate and drying the solution of protein in water.

10. In a method of separating protein from bovine serum the steps comprising precipitating protein from bovine serum by means of metaphosphoric acid, dissociating the precipitate in the presence of water containing an alkali which will form a water-insoluble compound with metaphosphate ions and recovering protein from the water.

11. In a method of separating protein from bovine serum comprising precipitating protein from bovine serum by means of metaphoric acid, separating metaphosphate radical from the precipitate by means of an aqueous solution of an alkali which will form a water-insoluble compound with metaphosphate ions, adding to the solution an acid which will not form with protein a water-insoluble compound to effect flocculation of alkali metaphosphate formed, separating flocculated alkali metaphosphate and recovering soluble protein from the water.

12. In a method of separating protein from bovine serum the steps comprising precipitating protein from bovine serum having a pH value within about the range pH 4.3–pH 1.0 by means of metaphosphoric acid, separating metaphosphate radical from the precipitate in the presence of water by means of an alkali which will form a water-insoluble compound with metaphosphate ions, under conditions of hydrogen ion concentration within about the range pH 6.0–pH 12.0, flocculating alkali metaphosphate formed by means of an acid which will not react with protein to form a water-insoluble compound in amount such as to adjust the pH value of the water within about the range pH 5.5–pH 1.0, separating flocculated alkali metaphosphate and recovering soluble protein from the water.

13. In a method of separating protein from bovine serum the steps comprising precipitating protein from bovine serum at a pH value within about the range pH 4.3–pH 1.0 by means of metaphosphoric acid, separating metaphosphate radical from the precipitate through the medium of calcium hydroxide in the presence of water, under conditions of hydrogen ion concentration within about the range pH 6.0–pH 12.0, flocculating the calcium metaphosphate formed by means of hydrochloric acid in amount to adjust the pH value of the water to within about the range pH 5.5–pH 1.0, neutralizing the solution, separating flocculated calcium metaphosphate and drying the solution of protein in water.

WILLIAM G. GORDON.